(12) United States Patent
Lue et al.

(10) Patent No.: US 10,947,329 B2
(45) Date of Patent: Mar. 16, 2021

(54) CATALYST SYSTEMS AND PROCESSES FOR USING THE SAME

(71) Applicant: Univation Technologies, LLC, Houston, TX (US)

(72) Inventors: Ching-Tai Lue, Sugarland, TX (US); Phillip T. Matsunaga, Houston, TX (US); Donna J. Crowther, Blairsville, GA (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/950,416

(22) Filed: Apr. 11, 2018

(65) Prior Publication Data
US 2018/0327524 A1 Nov. 15, 2018

Related U.S. Application Data

(60) Provisional application No. 62/504,011, filed on May 10, 2017.

(51) Int. Cl.
*C08F 4/653* (2006.01)
*C08F 4/6592* (2006.01)
*C08F 210/16* (2006.01)
*C08L 23/08* (2006.01)
*C08F 10/02* (2006.01)
*C08F 4/659* (2006.01)

(52) U.S. Cl.
CPC ............ *C08F 10/02* (2013.01); *C08F 210/16* (2013.01); *C08L 23/0815* (2013.01); *C08F 4/65912* (2013.01); *C08F 4/65916* (2013.01)

(58) Field of Classification Search
CPC . C08F 4/65904; C08F 4/65912; C08F 210/16
See application file for complete search history.

(56) References Cited

U.S. PATENT DOCUMENTS

| | | | |
|---|---|---|---|
| 4,530,914 A | 7/1985 | Ewen et al. | |
| 4,937,299 A | 6/1990 | Ewen et al. | |
| 5,470,811 A | 11/1995 | Jejelowo et al. | |
| 5,516,848 A | 5/1996 | Canich et al. | |
| 5,696,045 A | 12/1997 | Winter et al. | |
| 5,753,785 A | 5/1998 | Reddy et al. | |
| 6,388,115 B1 | 5/2002 | Crowther et al. | |
| 6,492,472 B2 | 12/2002 | Lue et al. | |
| 7,141,632 B2 | 11/2006 | Vaughan et al. | |
| 7,163,906 B2 | 1/2007 | McDaniel et al. | |
| 7,172,987 B2 | 2/2007 | Kao et al. | |
| 8,598,287 B2 | 12/2013 | Kuo et al. | |
| 8,759,243 B2 | 6/2014 | Coffy et al. | |
| 2002/0156208 A1* | 10/2002 | Floyd ...................... | C08F 10/02 526/127 |
| 2005/0153830 A1 | 7/2005 | Jensen et al. | |
| 2009/0306323 A1* | 12/2009 | Kolb ...................... | C07F 17/00 526/348.4 |

FOREIGN PATENT DOCUMENTS

| | | |
|---|---|---|
| EP | 0516018 A | 12/1992 |
| JP | 2014173054 | 9/2014 |
| WO | 9802470 | 2/1998 |

* cited by examiner

*Primary Examiner* — Caixia Lu
(74) *Attorney, Agent, or Firm* — Brooks, Cameron & Huebsch, PLLC

(57) ABSTRACT

A catalyst system including two or more metallocene catalysts and processes for using the same to produce polyolefin polymer compositions are provided. The polyolefin polymer compositions have a good balance of a melt index ratio and normalized melt strength.

9 Claims, No Drawings

CATALYST SYSTEMS AND PROCESSES FOR USING THE SAME

CROSS REFERENCE TO RELATED APPLICATIONS

This application claims the benefit of Ser. No. 62/504,011, filed May 10, 2017, the disclosure of which is hereby incorporated by reference in its entirety.

FIELD OF THE INVENTION

The invention relates to catalyst systems and processes for using the same. In particular, the invention relates to catalysts systems comprising the product of the combination of two or more metallocene catalysts and processes for the production of polyolefin polymers.

BACKGROUND OF THE INVENTION

The use of metallocene catalysts in polymerization processes to produce polyolefin polymers is known and has revolutionized the global plastics market. However, there remains an ongoing effort to develop catalyst systems comprising metallocene catalysts, polymerization processes using such catalyst systems, and polyolefin polymers and products made therewith, having advantageous properties and performance extending beyond recent advancements in the art. See, for example, U.S. Pat. Nos. 4,530,914; 4,937,299; 5,470,811; 5,516,848; 5,696,045; 6,492,472; 7,141,632; 7,163,906; and 7,172,987.

In particular, an area of focus for polyolefin polymers made from catalyst systems including metallocene catalysts has been directed the processability of these polymers. Processability generally refers to the ability to economically process and shape a polymer uniformly. Processability involves such elements as how easily the polymer flows, melt strength, and whether or not the extrudate is distortion free. See, for example, U.S. Pat. No. 8,598,287. Historically metallocene catalyzed polyethylenes (mPE) are somewhat more difficult to process than low-density polyethylenes (LDPE) made in high-pressure polymerization processes or using other catalyst systems. Generally, mPEs require more motor power and produce higher extruder pressures to match the extrusion rate of LDPEs. In addition, typical mPEs have lower melt strength which, for example, adversely affects bubble stability and drawdown capability during blown film extrusion, and they are prone to melt fracture at commercial shear rates. Nevertheless, mPEs exhibit superior physical properties as compared to LDPEs that make mPEs so attractive in the market place.

In particular, a good balance of properties is needed in order for a polyolefin resin to be processed effectively. Two properties that have a significant impact on resin processability are melt index ratio (MIR) ($I_{21}/I_2$) and melt strength (MS) (or normalized MS (nMS). Many metallocene catalysts that are evaluated for their ability to produce resins with good processability characteristics are able to enhance either MIR or MS, but not both. Therefore, it would be beneficial to a have a catalyst system and processes to polymerize with these catalyst systems that could provide polyolefin resins with a more effective balance of these properties. Thus, there remains for catalyst systems and processes for using the same that improve upon the balance of the MIR and MS of polyolefin polymer compositions that offer greater processability and other benefits. In particular, it would be desirable to have a mixed catalyst system composed of a high MIR component and a high MS component that can produce a polyolefin resin with a more balanced set of properties, and therefore better overall processability, than either of the separate catalyst components alone.

SUMMARY OF THE INVENTION

Embodiments disclosed herein provide for a catalyst system comprising the product of the combination of: a) two or more metallocene catalysts each independently represented by the formula:

$$L^A L^B L^C{}_i MAD,$$

wherein $L^A$ and $L^B$ are each independently substituted cyclopentadienyl or heterocyclopentadienyl groups π-bonded to M, containing from one to five substituent groups R, each R independently being a radical independently selected from hydrocarbyl, hydrocarbyl silyl or hydrocarbylgermyl groups having from 1 to 20 carbon atoms, silicon or germanium atoms, substituted hydrocarbyl, hydrocarbyl silyl or hydrocarbylgermyl radicals wherein one or more hydrogen atoms is replaced by a halogen radical, an amido radical, a phosphido radical, an alkoxy radical, an aryloxy radical, either of $L^A$ or $L^B$ may be a cyclopentadienyl ring in which at least two adjacent R groups are joined together and along with the carbon atoms to which they are attached to form a ring system having from 4 to 20 carbon atoms which may be saturated, partially unsaturated or aromatic, and substituted or unsubstituted and, the $L^A$ and $L^B$ ligands are covalently bridged together through a Group 14 linking group; $L^C{}_i$ is an optional neutral, non-oxidizing ligand having a dative bond to M, i equals 0 to 3; M is a Group 3-6 transition metal; and A and D are independently monoanionic labile ligands, optionally bridged to each other or $L^A$ or $L^B$, each having a σ-bond to M; wherein the catalyst system comprises a first metallocene catalyst having at least one of $L^A$ or $L^B$ with at least one $C_3$ or greater hydrocarbyl, hydrocarbyl silyl or hydrocarbylgermyl substituent and a second metallocene catalyst having at least one of $L^A$ or $L^B$ with only one or more methyl hydrocarbyl substituents; b) at least one activator; and c) optionally, at least one support.

In another class of embodiments, the invention provides for a polymerization process for the production of a polyolefin composition comprising contacting the catalyst system of as described above, under polymerizable conditions with ethylene and, optionally, one or more $C_3$-$C_{10}$ α-olefin comonomer to produce the polyolefin composition.

Other embodiments of the invention are described and claimed herein and are apparent by the following disclosure.

DETAILED DESCRIPTION OF THE INVENTION

Before the present compounds, components, compositions, and/or methods are disclosed and described, it is to be understood that unless otherwise indicated this invention is not limited to specific compounds, components, compositions, reactants, reaction conditions, ligands, metallocene and/or other catalyst structures, or the like, as such may vary, unless otherwise specified. It is also to be understood that the terminology used herein is for the purpose of describing particular embodiments only and is not intended to be limiting.

For the purposes of this patent specification and the claims thereto, the term terms "cocatalyst" and "activator" are used herein interchangeably and are defined to be any compound which can activate any one of the catalyst compounds described herein by converting the neutral catalyst compound to a catalytically active catalyst compound cation. The term "catalyst" refers to a metal compound that when combined with an activator polymerizes olefins, and the term "catalyst system" refers to the combination of a catalyst and an activator with a support. The terms "support" or "carrier," for purposes of this patent specification, are used interchangeably and generally refers to any medium upon which a catalyst optionally with other materials may be contacted with or disposed thereon.

"Catalyst system" is used to describe a catalyst compound/activator combination, optionally with other materials. For example, it may mean the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst, catalyst precursor, pre-catalyst compound, catalyst compound, transition metal complex, or transition metal compound, and these terms are used interchangeably. A "polymerization catalyst system" or simply an "olefin polymerization catalyst" is a catalyst system that can polymerize monomers to polymers.

An "anionic ligand" is a negatively charged ligand which donates one or more pairs of electrons to a metal ion. A "neutral donor ligand" is a neutrally charged ligand which donates one or more pairs of electrons to a metal ion. "Activator" and "co-catalyst" are also used interchangeably and generally refer to a catalyst system component that is capable of changing a catalyst into a form that can polymerize monomers to polymers.

A "scavenger" is a compound that is typically added to facilitate polymerization by removing and/or inhibiting impurities. Some scavengers may also act as activators and may be referred to as co-activators. A "co-activator," that is not a scavenger, may also be used in conjunction with an activator in order to form an active catalyst. Often, a co-activator can be pre-mixed with the transition metal compound to form an alkylated transition metal compound.

As used herein, the new notation for the Periodic Table Groups is used as described in Chemical and Engineering News, 63(5), 27 (1985), unless otherwise noted.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, including their substituted analogues. Substituted hydrocarbyl radicals are radicals in which at least one hydrogen atom of the hydrocarbyl radical has been substituted with at least one halogen (such as, for example, Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring. For purposes of this disclosure, "hydrocarbenyl" means a hydrocarbyl radical containing at least one olefinic double bond.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene and or propylene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. An ethylene polymer (or ethylene copolymer) is a polymer having at least 50 mol %, 60 mol %, 70 mol %, 80 mol %, or 90 mol % of ethylene, a propylene polymer (or propylene copolymer) is a polymer having at least 50 mol %, 60 mol %, 70 mol %, 80 mol %, or 90 mol % of propylene, and so on.

For the purposes of this invention and the claims thereto, the term "alpha olefin" or "α-olefin" refers to an olefin where the carbon-carbon double bond occurs between the alpha and beta carbons of the chain. Alpha olefins may be represented by the formula: $H_2C=CH-R*$, wherein each $R*$ is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, ethylene, propylene, 1-butene, 1-pentene, 1-hexene, 1-heptene, 1-octene, 1-nonene, and 1-decene are alpha olefins that are particularly useful in embodiments herein. For the purposes of this invention, ethylene shall be considered an alpha-olefin.

A "metallocene" catalyst or compound is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Unless otherwise noted all melting points (Tm) are DSC second melt.

The term "continuous" means a system that operates without interruption or cessation. For example, a continuous process to produce a polymer would be one where the reactants are continually introduced into one or more reactors and polymer product is continually withdrawn. However, a continuous system does contemplate some downtime for normal maintenance, upgrade, "debottlenecking," and/or idling due to market factors.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane, MMAO is modified methylalumoxane, Ind is indenyl, Cp is cyclopentadienyl, Flu is fluorenyl, TnOAl is tri-n-octyl aluminum, and RT is room temperature or ambient temperature (~23° C.-25° C., unless otherwise indicated).

Melt Strength (MS) of a polymer at a particular temperature may be determined with a Gottfert Rheotens Melt Strength Apparatus. To determine the melt strength, a polymer melt strand extruded from a capillary die is gripped between two counter-rotating wheels on the apparatus. The take-up speed is increased at a constant acceleration of 12 mm/sec$^2$. The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 20.1 mm/sec. The distance between the die exit and the wheel contact point is 125 mm.

For a given product family with specific catalyst and polymerization process, MS of a product is a strong function of its melt index (I2) (MI). On a semi-log plot of MS vs. MI, such a function often takes a linear form of:

$$MS = a - b*\log(MI) \quad \text{Eq-1,}$$

where; "a" is the MS of a product in this family when its MI is equal to one, and will be referred as normalized MS (nMS) hereafter. "b" is the slope in Eq-1, varying from one product family to the other. Since the slope "b" typically falls within a small range of 4.5-5.5, an averaged value of 5.2 for "b" was adopted. Therefore, nMS becomes the only differentiator among product families for a MS comparison. Thus, Eq-1 was reconfigured according to the following form of:

$$nMS = MS + 5.2*\log(MI) \quad \text{Eq-2.}$$

In any of the embodiments described herein, the polyolefin polymer composition may have an nMS of 6.0 cN or greater, 7.0 cN or greater, 7.5 cN or greater, of 8.0 cN or greater, 8.5 cN or greater, or 9.0 cN or greater. nMS stands for normalized melt strength using the definition provided above.

In any of the embodiments described herein, the polyolefin polymer composition may have a MIR ($I_{21}/I_2$) of 40 or greater, 45 or greater, 50 or greater, 55 or greater, 60 or greater, 65 or greater, 70 or greater, 75 or greater, or 80 or greater. Melt Index (MI, also referred to as $I_2$) is measured according to ASTM D1238 at 190° C., under a load of 2.16 kg unless otherwise noted. The units for MI are g/10 min or dg/min. High Load Melt Index (HLMI, also referred to as $I_{21}$) is the melt flow rate measured according to ASTM D-1238 at 190° C., under a load of 21.6 kg. The units for HLMI are g/10 min or dg/min. Melt Index Ratio (MIR) is the ratio of the high load melt index to the melt index or $I_{21}/I_2$.

Polymerization Catalyst
Metallocene Catalysts

The catalyst system may comprise the product of the combination of two more metallocene catalysts. In a class of embodiments, the catalyst system comprises the product of the combination of: a) two or more metallocene catalysts each independently represented by the formula:

$$L^A L^B L^C_i MAD,$$

wherein $L^A$ and $L^B$ are each independently substituted cyclopentadienyl or heterocyclopentadienyl groups π-bonded to M, containing from one to five substituent groups R, each R independently being a radical independently selected from hydrocarbyl, hydrocarbyl silyl or hydrocarbylgermyl groups having from 1 to 20 carbon atoms, silicon or germanium atoms, substituted hydrocarbyl, hydrocarbyl silyl or hydrocarbylgermyl radicals wherein one or more hydrogen atoms is replaced by a halogen radical, an amido radical, a phosphido radical, an alkoxy radical, an aryloxy radical, either of $L^A$ or $L^B$ may be a cyclopentadienyl ring in which at least two adjacent R groups are joined together and along with the carbon atoms to which they are attached to form a ring system having from 4 to 20 carbon atoms which may be saturated, partially unsaturated or aromatic, and substituted or unsubstituted and, the $L^A$ and $L^B$ ligands are covalently bridged together through a Group 14 linking group; $L^C$, is an optional neutral, non-oxidizing ligand having a dative bond to M, i equals 0 to 3; M is a Group 3-6 transition metal; and A and D are independently monoanionic labile ligands, optionally bridged to each other or $L^A$ or $L^B$, each having a σ-bond to M; wherein the catalyst system comprises a first metallocene catalyst having at least one of $L^A$ or $L^B$ with at least one $C_3$ or greater hydrocarbyl, hydrocarbyl silyl or hydrocarbylgermyl substituent and a second metallocene catalyst having at least one of $L^A$ or $L^B$ with only one or more methyl hydrocarbyl substituents.

In any of the embodiments described herein, for the first metallocene catalyst, $L^A$ and $L^B$ may be asymmetrically substituted in that the number or type of substituents on the rings are different. For the first metallocene catalyst and/or the second metallocene catalyst, the metal may be Zr or Hf, and the linking group may comprise Si.

In any of the embodiments described herein, for the first metallocene catalyst, $L^A$ may be a substituted cyclopentadienyl group and $L^B$ may be an unsubstituted fluorenyl group. For the second metallocene catalyst, $L^A$ and $L^B$ may be substituted cyclopentadienyl groups having three or four methyl substituents. For the second metallocene catalyst, the linking group may comprise Si and a hydrocarbyl ring structure. In addition, the labile ligands may comprise at least two halogen atoms or at least two methyl groups.

In a class of embodiments, the two or more metallocene catalysts may be selected from the group consisting of (tetraethyl-cyclopentadienyl)(n-propyl-cyclopentadienyl) zirconium dichloride or dimethyl, (pentamethyl-cyclopentadienyl)(n-propyl-cyclopentadienyl) zirconium dichloride or dimethyl, (tetramethyl-cyclopentadienyl)dimethylsilyl(3-n-propyl-cyclopentadienyl) zirconium dichloride or dimethyl, (tetrahydroindenyl)dimethylsilyl(3-n-propyl-cyclopentadienyl) zirconium dichloride or dimethyl, (tetramethyl-cyclopentadienyl)dimethylsilyl(2-methyl-4-n-propylcyclopentadienyl) zirconium dichloride or dimethyl, (indenyl)isopropylidene(3-n-propyl-cyclopentadienyl) zirconium dichloride or dimethyl, (indenyl)dimethylsilyl(3-n-propyl-cyclopentadienyl) hafnium dichloride or dimethyl, (1,3-dimethyl-cyclopentadienyl)(n-butyl-cyclopentadienyl) zirconium dichloride or dimethyl, (tetramethyl-3-n-propylcyclopentadienyl)(cyclopentadienyl) zirconium dichloride or dimethyl, (1-methyl-2-n-butylcyclopentadienyl)(methylcyclopentadienyl) zirconium dichloride or dimethyl, (1-methyl-3-ethylcyclopentadienyl)(1-methyl-3-n-propylcyclopentadienyl) zirconocene, (1,2,4-trimethyl-3.5-di-n-butylcyclopentadienyl) zirconium dichloride or dimethyl, (1-n-butylindenyl)(4-phenylindenyl) zirconium dichloride or dimethyl, (indenyl)dimethylsilyl(3-n-propyl-cyclopentadienyl) hafnium dichloride or dimethyl, (fluorenyl (dimethylsilyl) 3-propylcyclopentadienyl) zirconium dichloride or dimethyl), and (fluorenyl (dimethylsilyl) 2-methyl-3-benzylindenyl zirconium dichloride or dimethyl).

For example, the first metallocene catalyst may be represented by the formula:

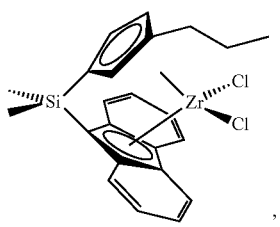

and the second metallocene catalyst is represented by the formula:

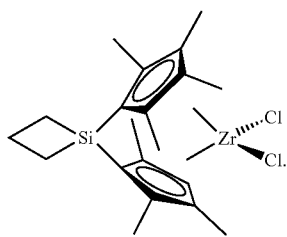

The catalyst system as described above may comprise at least one support and the first metallocene catalyst and the second metallocene catalyst may be disposed on the same at least one support or co-supported on the same at least one support.

Activators/Co-Catalyst

The catalyst system may comprise one or more activators or, alternatively, the catalyst(s) may be contacted with one or more activators. Non-limiting limiting examples include alumoxanes, aluminum alkyls, ionizing activators, which may be neutral or ionic, and conventional-type co-catalysts. Particular co-activators include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane activators may be utilized as an activator for an olefin polymerization catalyst. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane, isobutylalumoxane, and mixtures thereof. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, see, also, U.S. Pat. No. 5,041,584).

When the co-activator is an alumoxane (modified or unmodified), the maximum amount of co-activator is generally a 5000-fold molar excess Al/M over the catalyst compound (per metal catalytic site). The minimum alumoxane-to-catalyst-compound is a 1:1 molar ratio. Other ranges may include from 1:1 to 1000:1, such as 1:1 to 500:1. For instance, alumoxane may be employed at any one of about 500, 450, 400, 350, 300, 250, 200, 150, 100, 50, 25, and 1 mole(s) or less, per mole catalyst compound.

In addition or instead, catalyst systems may include at least one non-coordinating anion (NCA) co-activator. Non-coordinating anions useful in accordance with this invention are those that are compatible, stabilize the transition metal cation in the sense of balancing its ionic charge at +1, and yet retain sufficient ability to permit displacement during polymerization.

Preferred boron containing NCA activators are represented by the formula below:

$$Z_d^+(A^{d-}),$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3. The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums, and mixtures, preferably carboniums and ferroceniums. Often, $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenyl carbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethyl amine, diethyl amine, N-methyl aniline, diphenylamine, trim ethylamine, triethylamine, N,N-dimethylaniline, methyl diphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula [$M^{k+}Q_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halo substituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895. Illustrative, but not limiting, examples of boron compounds which may be used as an activating cocatalyst are the compounds described as (and particularly those specifically listed as) activators in U.S. Pat. No. 8,658,556.

Non-limiting examples include N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate. See U.S. Pat. No. 8,658,556.

Other non-limiting examples include N,N-dimethylanilium tetrakis(pentafluorophenyl)borate; N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, $[Ph_3C^+][B(C_6F_5)_4^-]$, $[Me_3NH^+][B(C_6F_5)_4^-]$; 1-(4-(tris(pentafluorophenyl)borate)-2,3,5,6-tetrafluorophenyl)pyrrolidinium; tetrakis (pentafluorophenyl)borate, 4-(tris(pentafluorophenyl) borate)-2,3,5,6-tetrafluoropyridine, bis($C_4$-$C_{20}$ alkyl)methyl ammonium tetrakis(pentafluorophenyl)borate and bis(hydrogenated tallow alkyl)methyl ammonium tetrakis(pentafluorophenyl)borate. See, also, U.S. Pat. No. 6,211,105. Any of the activators described herein may optionally be mixed together before or after combination with the catalyst(s).

Further, the typical NCA-to-catalyst ratio for each of the catalysts (e.g., all NCA-to-catalyst or all NCAs-to-catalysts ratio) is a 1:1 molar ratio. Alternative preferred ranges include from 0.1:1 to 100:1. For instance, NCA-to-catalyst ratio may be any one of about 0.5, 1, 2, 5, 10, 50, 75, 100, 200, 250, 300, 350, 400, 450, 500, 600, 700, 800, 900, and 1000 to 1. Often, the NCA-to-catalyst ratio may be within a range between any two of the foregoing. It is also within the scope of this invention that either or both of the mono-Cp amido group 4 complexes, bridged fluorenyl-cyclopentadienyl group 4 complexes, biphenyl phenol (BPP) transition metal complexes, pyridyl amide transition metal complexes and/or pyridyl diamide transition metal complexes and other catalyst compounds can be combined with combinations of alumoxanes and NCAs.

Often, the activator(s) is/are contacted with a catalyst(s) to form the catalyst system comprising activated catalyst(s) and activator or other charge-balancing moiety, before the catalyst system is contacted with one or more monomers. Alternatively, the activator(s) may be co-fed to catalyst(s) together with one or more monomers. Where two or more catalysts are utilized (i.e., a mixed catalyst system or dual catalyst system), each of the catalyst compounds may be contacted with their respective activator(s) (which, again, may be the same or different) before being mixed together. Where the same activator is used for each, a mixture of catalyst(s) mays be contacted with activator (either before or along with feeding of monomers to the catalyst mixture).

Supports

The catalyst system may comprise at least one support or the catalyst and activator, in any order, may be contacted with at least one support. The catalyst system may optionally be supported. The terms "support" or "carrier" are used interchangeably herein and refer to any support material, including inorganic or organic support materials. The term "supported" as used herein refers to one or more compounds that are deposited on, contacted with, vaporized with, bonded to, or incorporated within, adsorbed or absorbed in, or on, a support or carrier. In some embodiments, the support material can be a porous or semi-porous support material. In other embodiments, the support material can be a non-porous support material.

Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or cross-linked organic supports such as polystyrene divinyl benzene polyolefins or polymeric compounds, and mixtures thereof, and graphite, in any of its various forms. Non-limiting examples of inorganic support materials include inorganic oxides and inorganic chlorides.

Commercial supports include the ES70 and ES757 family of silicas available from PQ Corporation, Malvern, Pa. Other commercial supports include Sylopol™ Silica Supports including 955 silica and 2408 silica available from Grace Catalyst Technologies, Columbia, Md.

Examples of supporting a catalyst system are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,468,702; and 6,090,740; and PCT Publications WO 95/32995; WO 95/14044; WO 96/06187; and WO 97/02297.

The support may also be a silicate support. See, for example, WO 2016/094861. The silicate support may be an ion exchanged layered silicate support. Ion-exchange layered silicate useful in the present invention are silicate compounds having crystal structures wherein layers formed by strong ionic and covalent bonds are laminated in parallel with weak ionic bonding, and the ions contained between the layers are exchangeable. Most ion-exchange layered silicates naturally occur as the main component of clay minerals, but these ion-exchange layered silicates may be artificially synthesized materials. Preferred ion-exchange layered silicates useful in this invention include natural or synthetic montmorillonite, nontronite, beidellite, volkonskoite, laponite, hectorite, saponite, sauconite, stevensite, vermiculite, halloysite, aluminate oxides, bentonite, kaolinite, dickite, smectic clays, mica, magadiite, kenyaite, octosilicate, kanemite, makatite, attapulgite, sepiolite, zeolitic layered materials (such as ITQ-2, MCM-22, and ferrierite precursors) and mixtures thereof. Preferably, the ion-exchange layered silicate is acidified by contacting with an acid (such as sulfuric acid, hydrochloric acid, a carboxylic acid, an amino acid, or the like.)

Preferred ion-exchange layered silicates useful in this invention include those having a 1:1 type structure or a 2:1 type structure. Examples of the ion-exchange layered silicate include layered silicates having a 1:1 type structure or a 2:1 type structure as described in "Clay Mineralogy"

written by R. E. Grim (published by McGraw Hill in 1968) and "Chemistry of Clays and Clay Minerals" written by A. C. Newman (published by John Wiley and Sons: New York in 1987). The 1:1 type structure is a structure formed by laminating 1:1 layered structures having one layer of tetrahedral sheet and one layer of octahedral sheet combined as described in the above literature "Clay Mineralogy," and the 2:1 type structure is a structure formed by laminating 2:1 layered structures having one layer of octahedral sheet sandwiched between two layers of tetrahedral sheets. Examples of ion exchange layered silicate comprising the 1:1 layer as the main constituting layer include kaolin group silicates such as dickite, nacrite, kaolinite, metahalloysite, halloysite, or the like, and serpentine group silicates such as chrysotile, lizardite, antigorite, or the like. Examples of ion-exchange layered silicate comprising the 2:1 layer as the main constituting layer include smectite group silicates such as montmorillonite, beidellite, nontronite, saponite, hectorite, stephensite, or the like, vermiculite group silicates such as vermiculite, or the like, mica group silicates such as mica, illite, sericite, glauconite, or the like, and attapulgite, sepiolite, palygorskite, bentonite, pyrophyllite, talc, chlorites, and the like. Mixed layer silicates are also included. Often, an ion-exchange layered silicate having the 2:1 type structure is preferable. Preferably, a smectite group silicate is used and in a particularly preferable example the ion exchange layered silicate comprises montmorillonite.

Polymerization Processes and Olefin Monomers

The catalysts, catalyst system components, and catalyst systems described above are suitable for polymerization processes for the production of polyolefin polymers over a wide range of temperatures and pressures. Polymerization processes include solution, gas phase, slurry phase, super critical, a high pressure process, or a combination thereof, for example the same or different reactors in series or parallel.

A particularly preferred process is a gas phase or slurry phase polymerization process for the production of ethylene-based polymers and propylene-based polymers. For the sake of brevity and illustration purposes only, embodiments of the present invention will be further described below with an emphasis to the polymerization of ethylene monomer to make polyethylene polymers using a gas phase, fluidized bed polymerization process. However, in no way shall this be limiting to the scope of the claims unless affirmatively recited therein.

In any embodiment, the process of the invention may be directed toward a solution, high pressure, slurry or gas phase polymerization process of one or more olefin monomers having from 2 to 30 carbon atoms, preferably 2 to 12 carbon atoms, and more preferably 2 to 8 carbon atoms. In a class of embodiments, the polymerization of two or more olefin monomers of ethylene, propylene, butene-1, pentene-1, 4-methyl-pentene-1, hexene-1, octene-1 and decene-1 is preferred.

Other monomers include ethylenically unsaturated monomers, diolefins having 4 to 18 carbon atoms, conjugated or nonconjugated dienes, polyenes, vinyl monomers, cyclic olefins, and combinations thereof. Non-limiting examples of monomers useful include norbornene, 5-vinyl-2-norbornene, norbornadiene, isobutylene, isoprene, vinylbenzocyclobutane, styrenes, alkyl substituted styrene, ethylidene norbornene, dicyclopentadiene and cyclopentene.

Alternatively, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. Yet alternatively, ethylene or propylene is polymerized with at least two different comonomers, optionally one of which may be a diene, to form a terpolymer.

The catalyst system may be employed in liquid phase (solution, slurry, suspension, bulk phase, or combinations thereof), in high pressure liquid, supercritical fluid, or gas phase processes. Each of these processes may be employed in single, parallel, or series reactors. The liquid processes comprise contacting the ethylene and/or alpha-olefin and at least one vicinally disubstituted olefin monomer with the catalyst system described herein in a suitable diluent or solvent and allowing the monomers to react for a sufficient time to produce copolymers. One or more of the monomers used in the polymerization may be utilized as a solvent and/or diluent, generally in homogeneous polymerizations in the liquid monomer or monomers. Hydrocarbon solvents are also suitable, both aliphatic and aromatic, including hexane and toluene. Bulk and slurry processes may typically be accomplished by contacting the catalysts with a slurry of liquid monomer, the catalyst system being supported.

Gas phase processes may use the supported catalyst and may be conducted in any manner known to be suitable for producing ethylene homopolymers or copolymers via coordination polymerization.

Generally, the polymerization reaction temperature may vary from −50° C. to 250° C. The reaction temperature conditions may be from −20° C. to 220° C., or below 200° C. The pressure may vary from 1 mm Hg to 2500 bar, or from 0.1 bar to 1600 bar, or from 1.0 to 500 bar. Where lower molecular weight copolymers, e.g., $M_n \leq 10,000$, are sought, it may be suitable to conduct the reaction processes at temperatures above 0° C. and pressures under 500 bar.

The gas phase process can be operated in a condensed mode, where an inert or induced condensable/condensing agent/fluid is introduced to the process to increase the cooling capacity of the reactor system. These inert condensable fluids are referred to as induced condensing agents or ICA's. Condensed mode processes are further described in U.S. Pat. Nos. 5,342,749 and 5,436,304.

Additional polymerization process and related equipment details are more fully described in, for example, U.S. Pat. Nos. 4,543,399; 4,588,790; 5,028,670; 5,317,036; 5,352, 749; 5,382,638; 5,405,922; 5,436,304; 5,453,471; 5,462, 999; 5,616,661; 5,627,242; 5,665,818; 5,668,228; 5,677, 375; 5,804,678; 6,362,290; and 6,689,847.

Polymer Products

The polymers produced by the process of the invention can be used in a wide variety of products and end-use applications. The polymers produced can be homo- and co-polymers of ethylene and propylene and include linear low density polyethylene, elastomers, plastomers, high-density polyethylenes, medium density polyethylenes, low density polyethylenes, polypropylene and polypropylene copolymers. The term "polyethylene" or "polyethylene polymer" refers to a polymer having at least 50 wt % ethylene-derived units, at least 70 wt % ethylene-derived units, at least 80 wt % ethylene-derived units, or 90 wt % ethylene-derived units, or 95 wt % ethylene-derived units, or 100 wt % ethylene-derived units.

Polyolefin polymers, for example, polyethylene polymers, may have a density of from 0.860 g/cm³ to 0.970 g/cm³. In several embodiments, the density may be about ≥0.890 g/cm³, about ≥0.900 g/cm³, about ≥0.912 g/cm³, about ≥0.915 g/cm³, about ≥0.918 g/cm³, about ≥0.920 g/cm³, e.g., about ≥0.922 g/cm³, about ≥0.928 g/cm³, about ≥0.930 g/cm³, about ≥0.932 g/cm³ and the density may be about ≤0.945 g/cm³, e.g., about ≤0.940 g/cm³, about ≤0.937 g/cm³, about ≤0.935 g/cm³, about ≤0.933 g/cm³, about ≤0.930 g/cm³, or about ≤0.925 g/cm³. Ranges expressly disclosed include, but are not limited to, ranges formed by combinations any of the above-enumerated values, e.g., about 0.900 to about 0.940 g/cm³, about 0.912 to about 0.930 g/cm³, about 0.915 to about 0.925 g/cm³, about 0.920 to about 0.940 g/cm³, etc. Density is determined using chips cut from plaques compression molded in accordance with ASTM D-1928 Procedure C, aged in accordance with ASTM D-618 Procedure A, and measured as specified by ASTM D-1505.

Mn is number average molecular weight, Mw is weight average molecular weight, and Mz is z average molecular weight. Molecular weight distribution (MWD) is defined to be Mw divided by Mn. Unless otherwise noted, methods for determining such measurements are provided below and all molecular weight units (e.g., Mw, Mn, Mz) are g/mol.

Polyethylene polymers may have a weight average molecular weight (Mw) of from 20,000 up to 2,000,000 g/mol, 50,000 to 1,500,000 g/mol, 50,000 to 250,000 g/mol, 80,000 g/mol to 150,000 g/mol, 100,000 to 1,300,000 g/mol, 300,000 to 1,300,000 g/mol, or 500,000 to 1,300,000 g/mol.

Propylene based polymers produced include isotactic polypropylene, atactic polypropylene, and random, block, or impact copolymers. Preferred propylene polymer, preferably homopolymer, produced herein has an Mw of 20,000 up to 2,000,000 g/mol.

Polyolefin polymers, for example, polyethylene polymers, may have a melt index, $I_{2.16}$, or $I_2$ as a "shorthand," according to ASTM D-1238 (190° C./2.16 kg), of about ≥0.05 g/10 min, about ≥0.10 g/10 min, about ≥0.15 g/10 min, about ≥0.18 g/10 min, about ≥0.20 g/10 min, about ≥0.22 g/10 min, about ≥0.25 g/10 min, about ≥0.28 g/10 min, about ≥0.30 g/10 min, about ≥0.35 g/10 min, about ≥0.40 g/10 min, about ≥0.50 g/10 min and a melt index ($I_{2.16}$) about ≤10.00 g/10 min, about ≤7.00 g/10 min, about ≤5.00 g/10 min, about ≤3.00 g/10 min, about ≤2.00 g/10 min, about ≤1.00 g/10 min, about ≤0.70 g/10 min, about ≤0.50 g/10 min, about ≤0.40 g/10 min, or about ≤0.30 g/10 min. Ranges expressly disclosed include, but are not limited to, ranges formed by combinations any of the above-enumerated values, e.g., about 0.05 to about 10.00 g/10 min, about 0.10 to about 7.00 g/10 min, about 0.18 to about 0.22 g/10 min, about 0.50 to about 5.00 g/10 min, etc.

Preparation of Blends

The polyolefin polymers be blended and/or coextruded with any other polymers and/or or materials. Non-limiting examples of other polymers include linear low density polyethylenes, elastomers, plastomers, high pressure low density polyethylene, high density polyethylenes, isotactic polypropylene, ethylene/propylene copolymers, propylene-based polymers and propylene-base elastomers, and the like.

The polymer blend can be formed using conventional equipment and methods, such as by dry blending the individual components and subsequently melt mixing in a mixer or by mixing the components together directly in a mixer, such as, for example, a Banbury mixer, a Haake mixer, a Brabender internal mixer, or a single or twin-screw extruder, which can include a compounding extruder and a side-arm extruder. In an embodiment, the mixing comprises mixing the polyolefin polymer composition with an extruder and/or mixer.

In another embodiment, the polymer blend can be produced in situ using a multistage polymerization reactor arrangement and process. In a multistage reactor arrangement two or more reactors, the same or different, can be connected in series where a mixture of a first polymer component derived from one catalyst system can be transferred from a first reactor to a second reactor where a second polymer component derived another catalyst system or the same catalyst system of the first reactor but under different polymerization conditions can be produced and blended in situ with the first polymer component to produce a polyolefin polymer composition. A multi-stage polymerization reactor and methods for using the same is described, for example, in U.S. Pat. No. 5,677,375. Thus, in this embodiment, the mixing comprises mixing the polyolefin polymer composition in situ in a reactor, and, optionally, the mixing comprises mixing the polyolefin polymer composition in a series of reactors.

The polyolefin polymer composition may include at least 0.1 percent by weight (wt %) and up to 99.9 wt % of the first polymer composition and at least 0.1 wt % and up to 99.9 wt % of the second polymer composition, based on the total weight of the polyolefin polymer composition. The amount of the second polymer composition in the polyolefin polymer composition may range from a low of about 5 wt %, about 10 wt %, about 20 wt %, about 30 wt %, or about 40 wt % to a high of about 60 wt %, about 70 wt %, about 80 wt %, about 90 wt %, or about 95 wt %, based on the total weight of the polyolefin polymer composition. In a class of embodiments, the amount of the second polymer composition in the polyolefin polymer composition may range from about 15 wt % to about 40 wt %, about 10 wt % to about 35 wt %, or about 20 wt % to about 45 wt %, based on the total weight of the polyolefin polymer composition. In another class of embodiments, the amount of the second polymer composition in the polyolefin polymer composition may be at least 5 wt %, at least 10 wt %, at least 15 wt %, at least 20 wt %, at least 25 wt %, at least 30 wt %, or at least 35 wt % and less than about 50 wt %, based on the total weight of the polyolefin polymer composition. In an embodiment, the polyolefin polymer composition may include from about 20 wt % to about 35 wt % of the second polymer composition and from about 65 wt % to about 80 wt % of the first polymer composition, based on the total weight of the polyolefin polymer composition.

End-Use Applications

The polyolefin polymer composition may be used for any number of end-use applications. The polyolefin polymer composition can be used alone or in combination with one or more other polymers or materials, blends of polymers, and the like, to produce a variety of end-use articles. Such end-uses articles include, without limitation, films (e.g., blown and cast, optionally, oriented MD and/or TD), film-based products, film cells, film membranes, wrap films, diaper components, diaper backsheets, housewrap, personal care containers, pouches, stand-up pouches, liners, geo membranes, greenhouse films, bags, packaging, wire and cable coating compositions, articles formed by molding techniques, e.g., injection or blow molding, extrusion coating, foaming, casting, and combinations thereof. Exemplary end uses can include, but are not limited to, films, film-based products, diaper backsheets, housewrap, wire and cable coating compositions, articles formed by molding techniques, e.g., injection or blow molding, extrusion coating, foaming, casting, and combinations thereof. End-use articles can also include products made from films, e.g., bags, packaging, and personal care films, pouches, medical products, such as for example, medical films and intravenous (IV) bags. For end uses that include films, either or both of the surfaces of the films can be modified by known and conventional post-forming techniques such as corona discharge, chemical treatment, flame treatment, metallization, and the like.

Specific end use films can include, for example, stretch films. Illustrative stretch films or stretch-type films can include, but are not limited to, stretch cling films, stretch hand wrap films, and machine stretch films. Other types of films can include, but are not limited to, high stock films, shrink films, shrink wrap films, green house films, laminates, and laminate films. The films can be prepared by any conventional technique known to those skilled in the art, such as for example, techniques utilized to prepare blown, extruded, and/or cast stretch and/or shrink films (including shrink-on-shrink applications). The term "stretch film" refers to films capable of stretching and applying a bundling force and includes films stretched at the time of application as well as "pre-stretched" films, i.e., films which are provided in a pre-stretched form for use without additional stretching. The films can be monolayer films or multilayer films.

Examples

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Test Methods

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index or I21/I2.

Two different metallocene catalysts were co-supported or co-deposited on silica with MAO to form an activated mixed metallocene catalyst system. Methods for preparing the catalyst system and representative materials may be found in the inventive examples of U.S. Pat. Nos. 6,388,115, 6,800,704, and 6,960,634. The two metallocene catalysts are represented by the following structures, Catalyst A and Catalyst B:

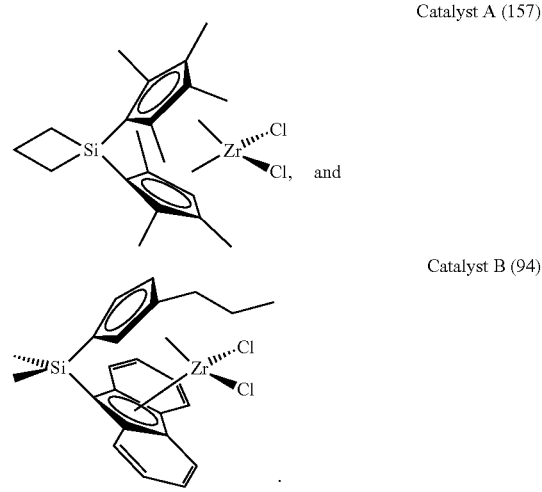

The catalyst system as described above was used in several polymerizations according to the process conditions in Table 1 utilizing gas-phase pilot plant reactors.

TABLE 1

|  | Reactor | | | | | |
| --- | --- | --- | --- | --- | --- | --- |
|  | R124 | R124 | R124 | G5 | G5 | Gt |
| 57/094 Ration | 2:1 | 3:1 | 3:1 | 3:1 | 4:1 | 5.7:1 |
| Rx Press | 300 | 300 | 300 | 350 | 350 | 350 |
| C2 mol % | 70 | 69 | 70 | 70 | 70 | 70 |
| Temp, C | 85 | 85 | 85 | 85 | 85 | 85 |
| H2, ppm | 475 | 609 | 713 | 951 | 1048 | 910 |
| C6/C2 | 0.015 | 0.015 | 0.015 | 0.015 | 0.013 | 0.12 |
| Res. Time, hr | 5.6 | 5.6 | 6 | 4.5 | 3.2 | 4.2 |
| MI | 0.3 | 0.5 | 0.7 | 2.1 | 2.0 | 1.7 |
| MFR | 50 | 60 | 55 | 31 | 39 | 39 |
| Den | 0.919 | 0.921 | 0.921 | 0.920 | 0.920 | 0.919 |
| Prod, lb/lb | 4933 | 4178 | 3948 | 3977 | 4032 | 4487 |

TABLE 2

|  | CAT A/ CAT B CoDeposit | CAT A/ CAT B CoDeposit | CAT A/ CAT B CoDeposit | CAT A/ CAT B CoDeposit | CAT A/ CAT B CoDeposit | CAT A/ CAT B CoDeposit | CAT A | CAT B |
| --- | --- | --- | --- | --- | --- | --- | --- | --- |
| Comonomer | C6 | C6 | C6 | C4 | C4 | C6 | C6 | C6 |
| Catalyst Ratio | 3/1 | 3/1 | 4/1 | 4/1 | 5.7/1 | 5.7/1 | — | — |
| Process | Gas | Gas | Gas | Gas | Gas | Gas | Gas | Gas |
| Density (g/cm3) | 0.921 | 0.918 | 0.921 | 0.922 | 0.922 | 0.921 | 0.921 | 0.918 |
| I2 (dg/min) | 2.07 | 1.67 | 1.91 | 1.28 | 2.06 | 1.57 | 0.88 | 2.52 |
| I21 (dg/min) | 68 | 55 | 77 | 50 | 73 | 64 | 64 | 73 |

TABLE 2-continued

|  |  | CAT A/<br>CAT B<br>CoDeposit | CAT A/<br>CAT B<br>CoDeposit | CAT A/<br>CAT B<br>CoDeposit | CAT A/<br>CAT B<br>CoDeposit | CAT A/<br>CAT B<br>CoDeposit | CAT A/<br>CAT B<br>CoDeposit | CAT A | CAT B |
|---|---|---|---|---|---|---|---|---|---|
| MIR | (I21/I2) | 33 | 33 | 40 | 39 | 36 | 41 | 73 | 29 |
| MS | (cN) | 5.6 | 6.7 | 5.8 | 7.0 | 5.7 | 6.5 | 7.2 | 3.9 |
| nMS | (cN) | 7.2 | 7.9 | 7.3 | 7.6 | 7.3 | 7.5 | 6.9 | 6.0 |

As shown in Table 2 above, examples of a mixed metallocene catalyst systems produce polymers having a good balance of properties. The examples made from a mixed metallocene catalyst system also show improvements over their individual catalyst components when polymerized separately. A good balance of properties is needed in order for a resin to be processed effectively. For example, two properties that have a significant impact on resin processability are melt index ratio (MIR) and normalized melt strength (nMS). Many metallocene catalysts that are evaluated for their ability to produce resins with good processability characteristics are able to enhance either MIR or MS, but not both. Therefore, it is beneficial to have a method of utilizing these mixed metallocene catalyst systems that provide for resins with a more effective balance of properties.

It has been demonstrated that a mixed catalyst system composed of a high MIR component and a high nMS component can produce a resin with a more balanced set of properties, and therefore better overall processability, than either of the separate catalyst components alone. As shown above, Catalyst A and Catalyst B can be combined together to give a catalyst system that produces a resin with a more favorable property balance of properties. In addition, this method allows the property balance to be adjusted and optimized by modifying the catalyst composition according to different catalyst ratios and process conditions to be tailored to specific product applications.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A catalyst system comprising the product of the combination of:
   a) two or more metallocene catalysts
   including a first metallocene catalyst represented by the formula:

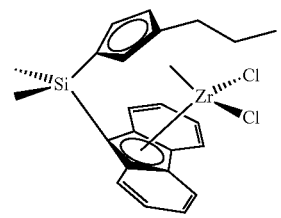

and a second metallocene catalyst represented by the formula:

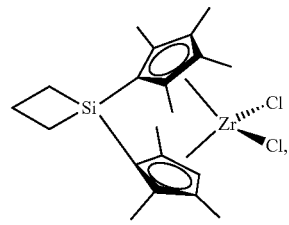

wherein a molar ratio of the second metallocene to the first metallocene is from 2:1 to 5.7:1;
   b) at least one activator; and
   at least one support, wherein the two or more metallocene catalysts are co-supported.

2. The catalyst system of claim 1, wherein the at least one support is present and the first metallocene catalyst and the second metallocene catalyst are disposed on the same at least one support.

3. The catalyst system of claim 1, wherein the at least one activator comprises an alumoxane, an aluminum alkyl, or an ionizing activator.

4. The catalyst system of claim 1, wherein the at least one activator comprises methylalumoxane (MAO), modified methylalumoxane (MMAO), ethylalumoxane, isobutylalumoxane, alkylalumoxane, or modified alkylalumoxane.

5. The catalyst system of claim 1, wherein the at least one support is present and comprises talc, clay, silica, alumina, silica-alumina, magnesia, zirconia, iron oxides, boria, calcium oxide, zinc oxide, barium oxide, thoria, aluminum phosphate gel, polyvinylchloride, substituted polystyrene, functionalized or cross-linked organic supports, polystyrene divinyl benzene, and graphite.

6. A polymerization process for the production of a poly olefin composition comprising contacting the catalyst system of claim 1, under polymerizable conditions with ethylene and, optionally, one or more C3-C10 a-olefin comonomer to produce the poly olefin composition.

7. The polymerization process of claim 6, wherein the catalyst system comprises the support.

8. The polymerization process of claim 6, wherein the process is a gas phase process.

9. The polymerization process of claim 6, wherein the process is a slurry phase process.

* * * * *